(12) United States Patent
Stumpert et al.

(10) Patent No.: US 7,764,623 B2
(45) Date of Patent: Jul. 27, 2010

(54) AUTOMATIC QUALITY OF SERVICE CLASS MANAGEMENT

(75) Inventors: Martin Stumpert, Hochspeyer (DE); Joerg Christian Ewert, Erkelenz (DE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 269 days.

(21) Appl. No.: 11/814,554

(22) PCT Filed: Feb. 1, 2005

(86) PCT No.: PCT/EP2005/001106

§ 371 (c)(1),
(2), (4) Date: Apr. 28, 2008

(87) PCT Pub. No.: WO2006/081832

PCT Pub. Date: Aug. 10, 2006

(65) Prior Publication Data

US 2009/0097402 A1 Apr. 16, 2009

(51) Int. Cl.
*H04L 12/56* (2006.01)
(52) U.S. Cl. ...................................... 370/252; 370/465
(58) Field of Classification Search ................. 370/252, 370/465
See application file for complete search history.

(56) References Cited

U.S. PATENT DOCUMENTS

| | | | |
|---|---|---|---|
| 2002/0114305 A1* | 8/2002 | Oyama et al. | 370/338 |
| 2008/0320564 A1* | 12/2008 | Duan | 726/4 |
| 2009/0304015 A1* | 12/2009 | Willars et al. | 370/412 |
| 2010/0039936 A1* | 2/2010 | Jin et al. | 370/230 |

OTHER PUBLICATIONS

3GPP TS 29.060 V6.7.0 (Dec. 2004), General Packet Radio Service (GPRS); GPRS Tunnelling Protocol (GTP) across the Gn and Gp Interface (Release 6), pp. 1-22.*
3GPP Group Services and System Aspects: "TS 23.307 V6.4.0: End-to-End Quality of Service (QoS) concept and architecture" 'Online! Sep. 2004, 3GPP, Sophia Antipolis France, XP002325835, pp. 1-53.
3GPP Core Network: TS 29.060 V.6.7.0: General Packet Radio Service (GPRS); GPRS Tunnelling Protocol (GTP) across the Gn and Gp interface: 'Online! Dec. 2004, 3GPP. Sophia Antipolis (France), XP002325836, pp. 1-122.
3GPP Group Services and System Aspects: "TR 23.802 V0.3.0: Architectural Enhancements for End-to-End Quality of Service (QoS)" 'Online! Nov. 2004, 3GPP, Sophia Antipolis (France), XP002325837, pp. 1-25.

* cited by examiner

*Primary Examiner*—Melvin Marcelo

(57) ABSTRACT

To enhance quality of service management in support of application sessions running on top of bearer services, according to the present invention it is suggested to, firstly, execute a bearer service analysis in support of automatic quality of service class management. Heretofore, a bearer service carrying packet switched service traffic in support of an application session is analyzed for identification of different types of services by the application session. Related analysis information derived at an analysis unit 10 is then forwarded to a quality of service management unit 16, which is adapted to automatic quality of service class management. In particular, the quality of service management unit 16 determines and manages a quality of service class according to the identified quality of service class as forwarded by the bearer service analysis unit 10.

35 Claims, 5 Drawing Sheets ively increased. Typical

AUTOMATIC QUALITY OF SERVICE CLASS MANAGEMENT

FIELD OF INVENTION

The present invention relates to automatic quality of service class management, and in particular to automatic quality of service class management methods and networking nodes operated in support of an application running on top of a bearer service.

BACKGROUND ART

In XP-002325835, there is described a 3GPP technical specification of group services and system aspects, in particular an end-to-end quality of service concept and architecture. Also, there are described IP level mechanisms necessary in providing end-to-end quality of service involving GPRS networks, including possible interaction between the IP level and the GPRS level, as well as the application level and the IP level.

Also, in XP-002325836, there is described an operation of a charging gateway and a related PDP context information with respect to session management parameters. Here, a quality of service profile information element includes quality of service negotiated between the mobile station and a serving data support node at PDP context activation or a new quality of service QoS negotiated in the PDP context modification procedure.

Further, in XP-002325837, there is described a 3GPP technical specification of architectural enhancements for end-to-end quality of service operation. In particular, there is described a concept of an admission administrative domain, wherein the admission administrative domain defines a set of bearer devices and gateway whose resources and routes are managed.

Recently, the variety of application sessions to be operated on top of a wireless bearer has significantly increased. Typical examples are video clips, SMS short message services, MMS multi-media message services, ring tone downloads, WAP services, wireless WEB services, point-to-point multimedia services, etc.

According to the different type of application sessions, usually different types of bearer services will be initiated, either in a core network or a wireless access network. Further, different application services require different quality of service classes for the underlying bearer services specifying maximum bit rate, delivery order, maximum service data unit size, service data unit format information, service data unit error ratio, bit error ratio, delivery of erroneous service data units, transfer delay, guaranteed bit rate, traffic handling priority, allocation/retention priority, source statistics descriptor, signaling indication, to name just some of bearer service attributes specified according to quality of service classes.

However, with existing solutions for identifying quality of service class for a specific application session in view of available bearer services a problem is that the application session running in the end terminal needs to request via an application programming interface from the bearer service a certain quality of service class. This requires that the application session as such needs to be updated regarding functionality for quality of service class specification.

Further, the conventional technology requires that the application session is aware of available quality of service class definitions on the bearer service level, which quality of service class definitions may differ and vary according to different standardizations.

SUMMARY OF INVENTION

In view of the above, the object of the present invention is to enhance quality of service management in support of application sessions running on top of bearer services.

According to the present invention, this object is achieved, firstly, by a method of bearer service analysis in support of automatic quality of service class management. According to this method, a bearer service carrying packet switched service traffic in support of an application session is analyzed for identification of at least one type of service used for the application session. Then, the result of bearer service analysis is forwarded to a networking unit adapted to automatic quality of service class management according to the identified at least one least one type of service.

Also, according to the present invention, the analysis of bearer services is achieved by applying a filtering approach, in particular with respect to characteristics of protocols used for exchange of packet switched service traffic. Preferably, such characteristics may identify address ranges, port number ranges and/or protocol types.

According to the present invention, an analysis of bearer service may be based on reuse of information determined for flexible bearer service charges. A preferred embodiment of the present invention is particularly efficient in that only information already derived for charging of networking functionality may be reused for automatic quality of service charging.

An important advantage of the present invention is that through the analysis of the bearer service carrying the packet switched traffic in support of an application session, it is possible to avoid involvement of the application session itself in the determination of type of service and related necessary quality of service classes.

In other words, the application session itself may just initiate necessary traffic via bearer service in view of application requirements without being aware, firstly, of related quality of service class requirements and, secondly, available bearer services at all. It is through forwarding of the result of the bearer analysis to the networking unit which handles quality of service class that management of the quality of service class is done in an automatic manner according to bearer service traffic rated in view of the application sessions.

Further preferred embodiments of the present invention relate to the method of bearer service analysis.

A further preferred embodiment of the present invention with respect to bearer service analysis relies on identification of characteristics of actual service traffic. Such characteristics may preferably relate to, e.g., average length of a service message and/or timing lapsing between two service messages as characteristics identifying quality of service class requirements.

A further preferred embodiment of the present invention regarding analysis of bearer service requests a highest quality of service class at the beginning of bearer service delivery, which is of particular advantage in that during wrap-up of a bearer service delivery situation, an application session remains inoperative due to lack of sufficient bearer service capacity which is strictly avoided.

Further to the aspect of bearer analysis, the object outlined above is achieved by a method of automatic quality of service class management in support of an application session running on top of a bearer service carrying packet switched traffic. Here, it is suggested that an indication of at least one type of service used by an application session is achieved at a networking node managing the quality of service class. Then, a quality of service class is determined according to at least one type of service used by the application session, and then a quality of service class is requested for the bearer service according to the determined quality of service class.

Still further, for management of quality of service classes, it is suggested to keep track of quality of service classes requested according to type of service and/or to notify a flexible bearer charging unit adapted to change of bearer service delivery on the change of quality of service class. The first is beneficial in that a repeated requesting of quality of service classes not supported by the bearer network may be avoided. The latter is beneficial in that always appropriate charging will be achieved also in view of a change of quality of service class during ongoing bearer service delivery.

In other words, according to the present invention, the setting of the quality of service class is done by a method of automatic quality service class management operated in a network and not by an application running at a user equipment. Therefore, the inventive approach allows for automatic selection of quality of service classes without involvement of user equipment and related application sessions running thereat to improve portability and network independency of application functionality at the user and equipment.

Further preferred embodiments of the present invention are related to automatic quality of service management within the network providing the services.

Here, according to a preferred embodiment, it is suggested to determine a quality of service class from the at least one type of service ab initio for start of an application session.

Alternatively, according to a second preferred embodiment of this aspect, one could consider an ongoing application session and related bearer services. Assuming that bearer service level of the network is adapted to select a quality of service on its own, according to the present invention it is suggested to compare such a bearer level initiating quality of service class with a quality of service class determined according to a type of service. Should such comparison indicate a deviation between the two different values for the quality of service class, it is then suggested to request a quality of service class change of the bearer service initiated by the networking node managing the quality of service class.

Here, it should be noted that generally, according to the present invention, the bearer service analysis and the quality of service class may either be operated in different networking nodes operating on a stand-alone basis or, alternatively, be combined to a single networking node handling both aspects of bearer service handling and quality of service class management which would typically be a gateway networking node.

Preferably, for the management of the quality of service class according to the present invention it is suggested to reference a mapping table establishing a relation between at least one type of service and a related quality of service class. Optionally, such a pre-storage of quality of service class relating information may also be a quality of service class setting range defining an allowable range of quality of service class with respect to a single application, a class of applications, etc. This allows to consider a throughput of application traffic for the bearer service network as a whole to avoid a bottleneck due to assignment of a too high quality of service class for a single application session.

Yet another preferred embodiment of quality of service class management according to the present invention is related to involvement of an application user during quality of service class management, here, as option and as specific part of end user satisfaction enhancement.

According to another preferred embodiment of the present invention there is provided a computer program product directly loadable into the internal memory of a networking node adapted to bearer service analysis in support of automatic quality of service class management comprising software code portions for performing the inventive bearer service analysis process when the product is run on a processor of a networking node adapted to bearer service analysis.

Also, according to another preferred embodiment of the present invention there is provided a computer program product directly loadable into the internal memory of a networking node adapted to automatic quality of service class management in support of an application session running on top of a bearer service carrying packet switched traffic comprising software code portions for performing the inventive quality of service class management process when the product is run on a processor of the networking node adapted to automatic quality of service class management.

Therefore, the present invention is also provided to achieve an implementation of the inventive method steps on computer or processor systems. In conclusion, such implementation leads to the provision of computer program products for use with a computer system or more specifically a processor comprised in e.g., an apparatus for automatic quality of service class management.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and hard drives; or information convey to a computer/processor through communication media such as network and/or Internet and/or telephone networks via modems or other interface devices. It should be understood that such media, when carrying processor readable instructions implementing the inventive concept represent alternate embodiments of the present invention.

Thus, according to the present invention it is an important advantage that a user of an application does need to configure a quality of service class for an application session he is initiating. Also, application sessions running on a user equipment do not need to be updated for setting of quality of service classes, and further the user equipment does not need to be involved and to be provided with information about quality of service class definition which is used in the network running the bearer services.

BRIEF DESCRIPTION OF DRAWING

In the following, the best mode of the present invention and preferred embodiments thereof will be described with reference to the drawing, in which.

BEST MODE AND PREFERRED EMBODIMENTS OF INVENTION

Figure 1:
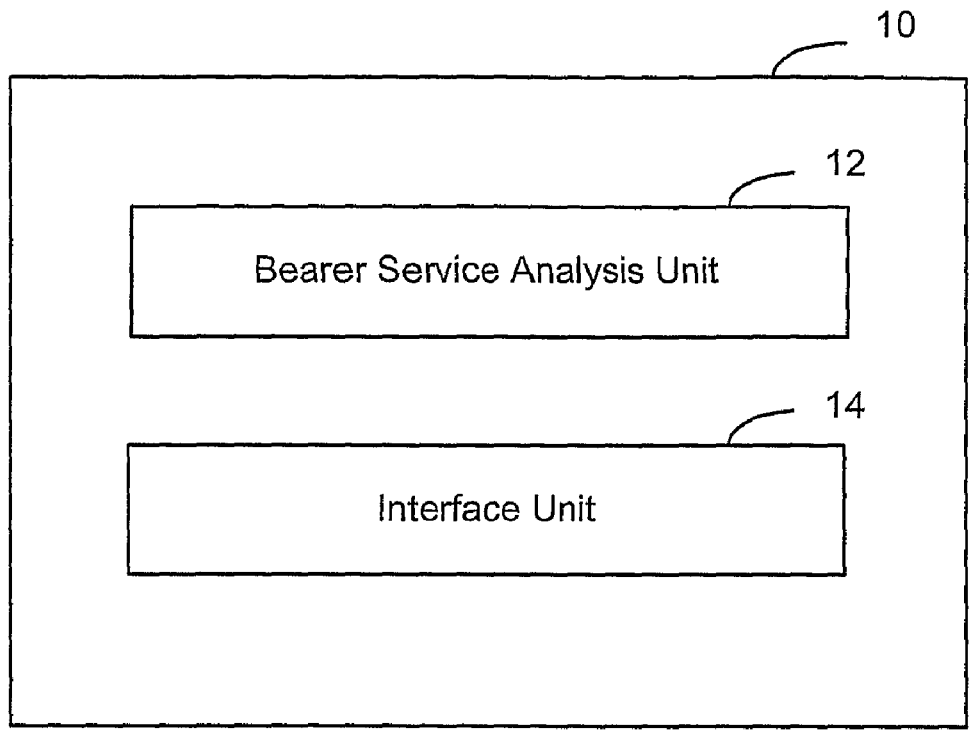
FIG. 1 shows a schematic diagram of a networking node according to bearer service analysis in support of automatic quality of service class management according to the present invention.

In the following, the best mode of the present invention as well as preferred embodiments thereof will be described with reference to the drawing. Insofar as different aspects, concepts and features of the present invention are described either on the level of function or structure, it should be noted that any such functionality according to the present invention may be realized either in software, hardware and/or a combination thereof.

As will be outlined in more detail in the following, the present invention relates to the aspects of bearer service analysis and, on the basis thereof, to quality of service class management in support of application sessions running on top of a bearer service. Heretofore, a first networking node is related to the aspect of bearer service analysis, and a second networking node is related to the aspect of quality of service class management. Either both networking nodes are operated independently as stand-alone networking nodes, or integrated into one networking unit operated for delivery of bearer services.

FIG. 1 shows a schematic diagram of a networking node scene adapted to bearer service analysis in support of automatic quality of service class management.

As shown in FIG. 1, the networking node 10 adapted to bearer service analysis comprises a bearer service analysis unit 12 adapted to analyze a bearer service carrying packet switched service traffic in support an application session for identification of at least one type of service used via the application session, and an interface unit 14 adapted to forward a result of bearer service analysis to a networking unit adapted to automatic quality of service class management according to the identified at least one type of service. Here, it should be noted that according to the present invention, the different structure of the units of the networking node 10 may be implemented using commercially available other components and processors, through application of special purpose hardware, or through development of appropriate computer program products.

Figure 2:
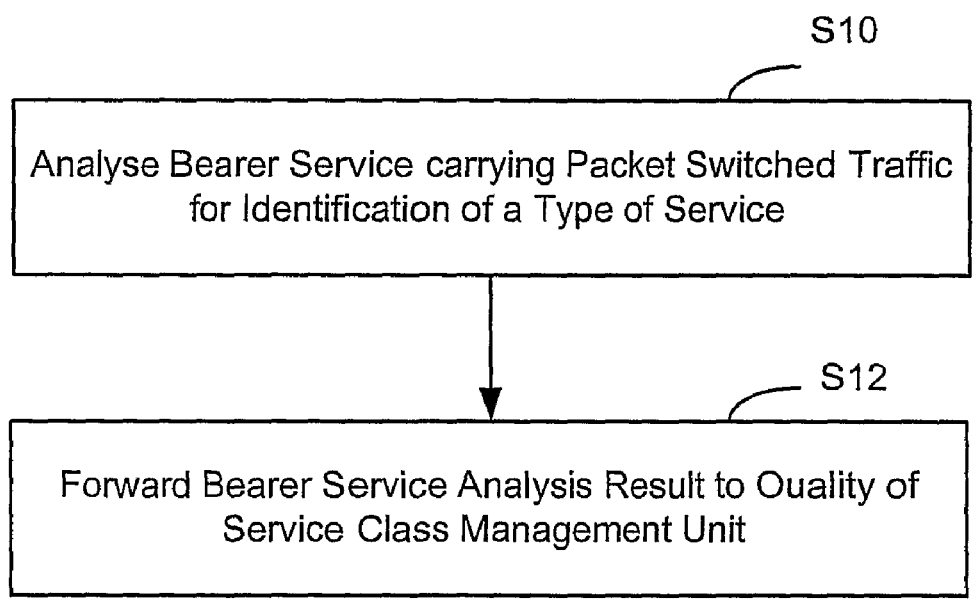
FIG. 2 shows a flowchart of operation of the networking unit adapted to bearer service analysis shown in FIG. 1.

FIG. 2 shows a flowchart of operation of the networking node 10 adapted to bearer service analysis shown in FIG. 1.

As shown in FIG. 2, operatively the bearer service analysis unit 10 executes a step S10 to analyze a bearer service carrying packet switched traffic for identification of a type of service. The basis thereof, the interface unit 14, executes a step S12 to forward the bearer service analysis result to a quality of service class management unit to be explained in more detail in the following.

In the step S10, the bearer service analysis unit 12 may analyze the bearer service by filtering characteristics of protocols used for exchange of packet switched service traffic which, e.g., can be related to addresses of data packets, port number of data packets, and/or protocol types. Here, typical examples of distinguishing between different contents and service types, e.g., implemented in a gateway GGSM are the identification of different services based on the following filtering criteria:

IP address/net mask;
UDP/TCP port number or ranges;
Protocol types and ICMP types; and/or
WAP1.x, URI/URL, host name and folder, WAP 2.x/http, URI/URL, host name and folder, WAP 1.x/2.x connection signaling.

As alternative to the above or in combination therewith, the step of analyzing a bearer service carrying packet switched service S10 may comprise a reuse of information determined for flexible bearer service charging.

Here, this approach of the present invention relates to concepts of flexible bearer charging where three different types of possible charging are applied in a packet switched bearer network:

Contents charging: Charging is based on the actual content value. Here, content charging is applicable when users purchase a content. The charging type is preferably performed using charging information from a content server in a service networking domain.

Service: Charging is performed per transaction on a particular service, e.g., per short message service SMS per or multi-media message service MMS. This type of charging is preferably performed using charging information from an application server in the service networking domain.

Bearer charging: Charging is based on the transferred volume or application session duration if a charging is comparable to consume minutes for voice call in the circuit switched domain. This charging type is preferably performed in a network node of a core networking domain.

From the above, it becomes clear that in view of the different prizing models, all these prizing models imply the derivation of information that also serves to identify the type of service which may then be forwarded to a networking node handling management of quality of service class, as will be explained in more detail in the following.

Further to the above, operatively the bearer service analysis unit 12 may also analyze the bearer service in a step S10 in view of identifying characteristics of the packet switched service traffic. This implies that the bearer service analysis unit 12 identifies, e.g., the average length of a service message and/or timing lapsing between two service messages, etc., which may then form the basis for identifying the type of service. Typically, the length of a service message may be related to the amount of data transferred between the different application end points, and timing lapsing between two service messages may be used to characterize burstiness of application related traffic.

In the following, further aspects of the present invention being related to quality of service class management will be illustrated with respect to FIGS. 3 and 4.

Figure 3:
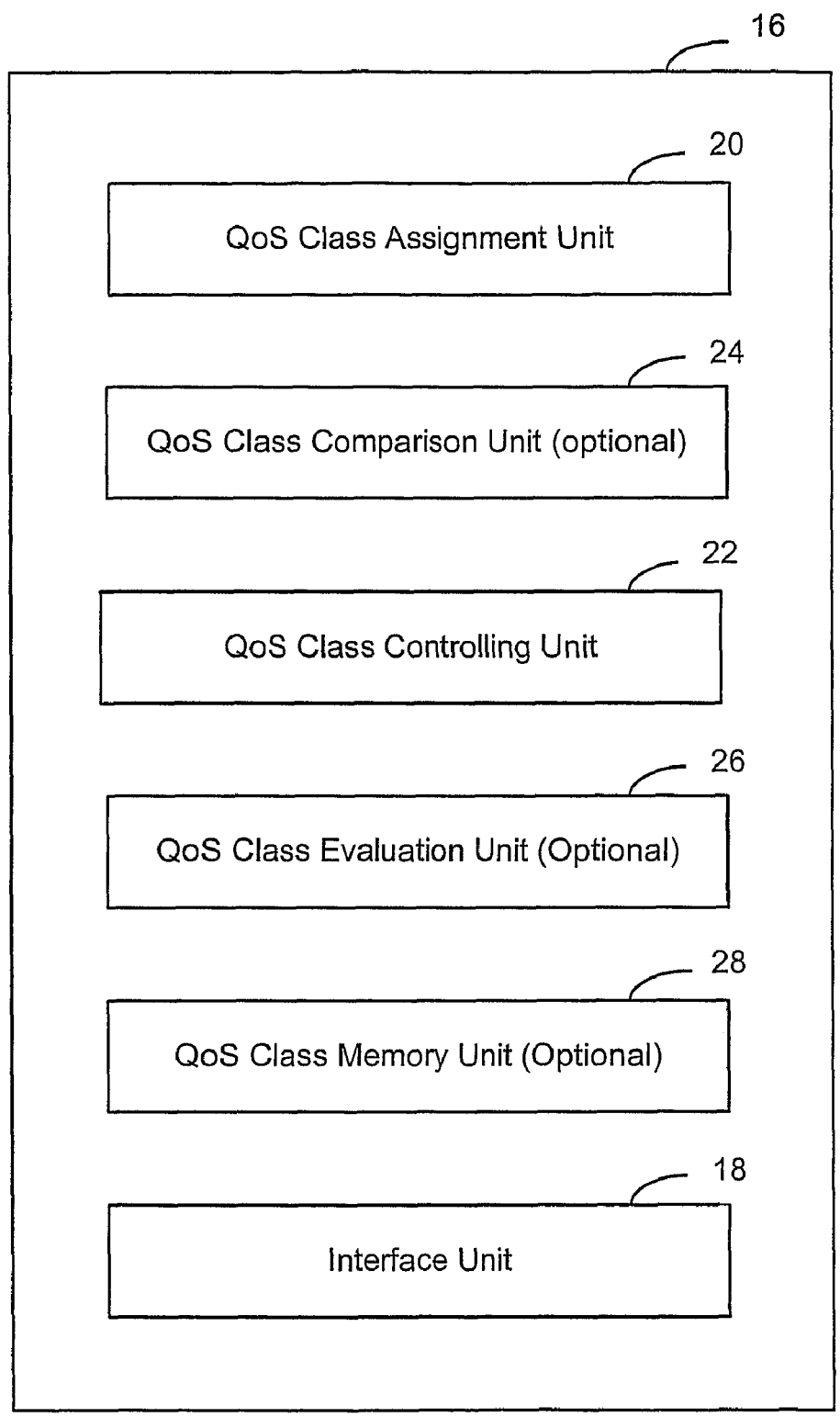
FIG. 3 shows a schematic diagram of a networking node adapted to automatic quality of service class management according to the present invention.

FIG. 3 shows a schematic diagram of a networking node 16 adapted to automatic quality of service class management in support of an application session running on top of a bearer service carrying packet switched traffic.

Figure 4:
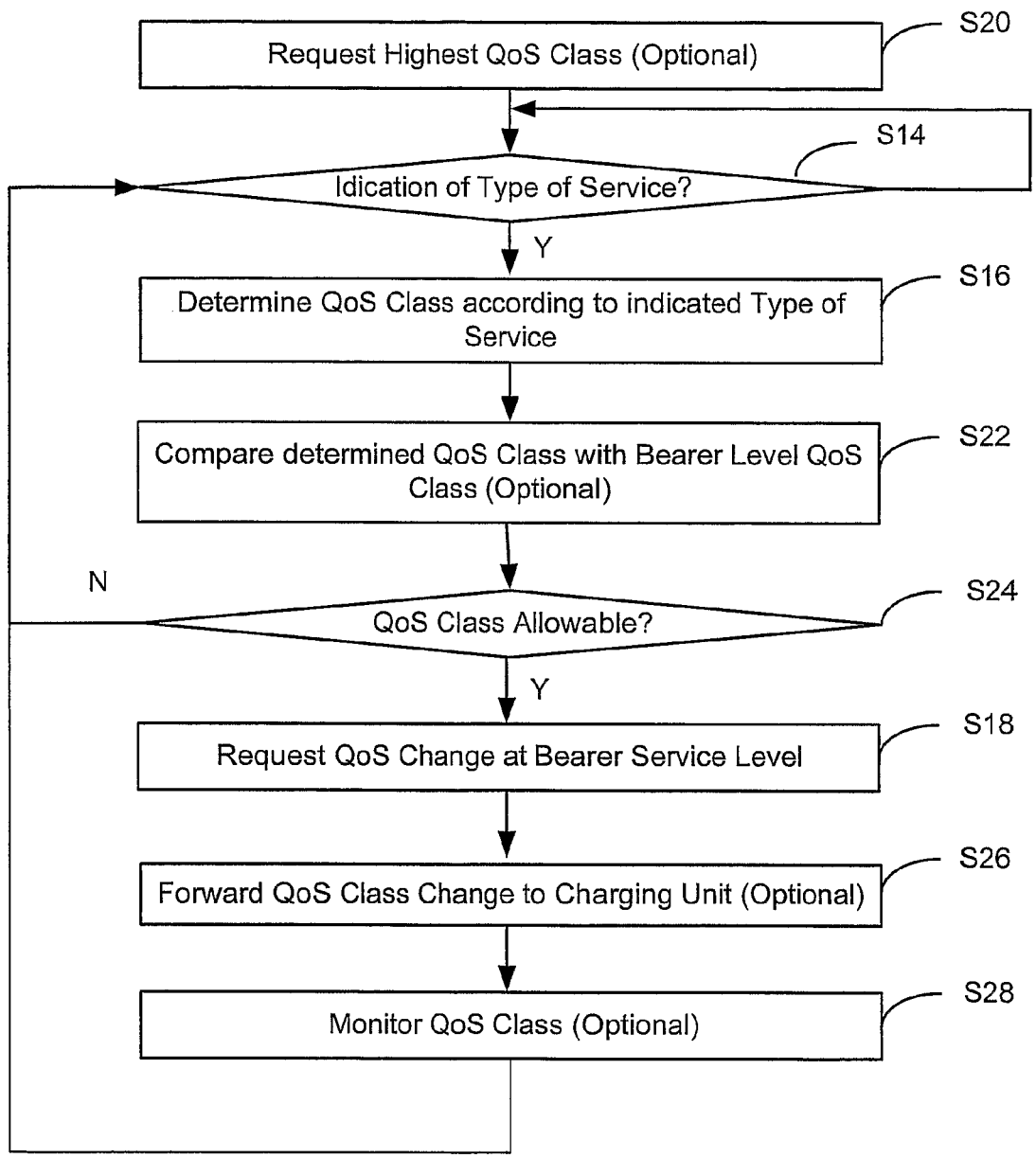
FIG. 4 shows a flowchart of operation of the networking node adapted to automatic quality of service class management shown in FIG. 3.

FIG. 4 shows a flowchart of operation of the networking node 16 adapted to automatic quality of service class management shown in FIG. 3.

As shown in FIG. 3, the networking node adapted to automatic quality of service class management at least comprises an interface unit 18, a quality of service class assignment unit 20 and a quality of service class controlling unit 22. Optionally, the networking node 16 adapted to automatic quality of service class management may also comprise a quality of service class comparison unit 24, a quality of service class evaluation unit 26, and a quality of service class memory unit 28.

FIG. 4 shows a flowchart of operation of the networking node 16 adapted to automatic quality of service class management shown in FIG. 3.

As shown in FIG. 4, in a step S14 the interface unit 18 shown in FIG. 3 evaluates the receipt of an indication of at least one type of service used by an application session. This receipt is in correlation to the forwarding of a related indication of type of service by the networking node 10 adapted to bearer service analysis as outlined above with respect to FIGS. 1 and 2. Further, should clarification of a type of service be received in the step S14, the further operation of the networking node 16 will be delayed until indication of such a receipt.

As shown in FIG. 4, operatively the quality of service class assignment unit 20 will execute a step S16 to assign a quality of service class according to at least the type of services by the application session.

As shown in FIG. 4, operatively the quality of service class controlling unit 22 will execute a step S18 for requesting a quality of service class determined in step S16 from the bearer service level.

While above quality of service classes have been referred to in general, a typical example of such quality of service classes could be:

Traffic class: This is a quality of service class reporting fundamental characteristics for basic service delivery.

Conversational class: This quality of service class preserves a time relation/variation between information entities of a data stream and is typically selected for voice applications.

Streaming class: This quality of service class preserves time relation/variation between information entities of a data stream and is adapted, e.g., to the streaming of video.

Interactive class: This quality of service class is related to best effort and adapted to request response pattern. The interactive class preserves payload content and is typically adapted to, e.g., web browsing.

Background: This quality of service class is provided for destinations which do not expect a data within a certain time limit, nevertheless, preserves payload content. It is typically applied to background applications like download of emails.

It should be noted that one typical field of application of the quality of service classes listed above is mobile communication, e.g., according to UMTS. Further, it is important to keep in mind that a quality of service class is an end-to-end application characteristic between two communicating applications, which means that quality of service classes needs to be negotiated and then mapped to bearer service attributes. One example of the mapping of a quality of service class determined on a quality of service class management level onto attributes on the bearer service level like maximum bit rate, delivery order, maximum service data unit SDU size, service data unit SDU format information, service data unit SDU error ratio, residual bit error ratio, delivery of erroneous service data units, transfer delay, guaranteed bit rate, traffic handling priority, allocation/retention priority, source statistics descriptor, signaling indication, etc., could be as follows:

| Traffic class | Conversational class | Streaming class | Interactive class | Background class |
|---|---|---|---|---|
| Maximum bit rate | x | X | x | X |
| Delivery order | x | X | x | X |
| Maximum SDU size | x | X | x | X |
| SDU format information | x | X | | |

-continued

| Traffic class | Conversational class | Streaming class | Interactive class | Background class |
|---|---|---|---|---|
| SDU error ratio | x | X | x | X |
| Residual bit error ratio | x | X | x | X |
| Delivery of erroneous SDUs | x | X | x | X |
| Transfer delay | x | X | | |
| Guaranteed bit rate | x | X | | |
| Traffic handling priority | | | x | |
| Allocation/retention priority | x | X | x | X |
| Source statistics descriptor | x | X | | |
| Signaling indication | | | x | |

In the following, further steps of quality of service class determination according to the present invention will be explained. Here, it is to be noted that these steps are to be optional and not mandatory during execution of the quality of service class management according to the present invention.

As shown in FIG. 4, a first such optional step S20 relates to the initiation of the overall quality of service class management process and is executed by the quality of service class controlling unit 22. Here, according to the present invention, a quality of service class controlling unit 22 assigns the highest quality of service class at the very beginning of quality of service class management to ensure appropriate initiation of bearer services in support of related application sessions.

A further optional aspect of quality of service class management according to the present invention is related to interaction between the higher networking levels handling quality of service classes and the bearer service level. While existing communication networks have installed mechanisms that allow for quality of service class determination of the bearer service level, these quality of service classes are, as has been explained above, usually derived through interaction with the application sessions. However, according to the present invention, there is proposed to have an interaction between the bearer service level and the upper networking levels identifying a quality of service class in view of the analyzed type of service. Here, in a step S22 the quality of service class comparison unit 24 will compare the quality of service class derived from the type of service with the quality of service class determined on the bearer level. Should any deviation occur, then the quality of service class controlling unit 22 will execute the step S18 to request a quality of service class change at the bearer service level. Otherwise, the quality of service class controlling unit 22 will run idle so that no request for quality of service class change will be forwarded to the bearer service level.

Further, the determination of a quality of service class according to the type of quality service in step S16 may be determined by referencing a mapping table establishing a relation between the at least one type of service and a quality of service, i.e. a related data base. The same data base or a different data base may also be used for storing an allowable range of quality of service classes on the bearer level which will also be referred to as quality of service class setting range in the following.

As shown in FIG. 4, the storage of a quality of service class setting range forms the prerequisite of the execution of a step S24 preceding the submission of a request to a quality of service class change request to the bearer service level. In this step S24, operatively executed by the quality of service class controlling unit 22, it is determined whether a quality of service class determined on the upper networking layer according to the type of service is allowable in view of the predetermined quality of service class setting range. If this is not the case, the procedure shown in FIG. 4 will branch back to step S14 to await indication of a new type of service for subsequent determination of the quality of service class. Otherwise, the request for the quality of service class change is allowable and will be forwarded to the bearer service level according to step S18.

As shown in FIG. 4, optionally the quality of service class controlling unit 22 will execute a step S26 to forward the determined quality of service class/quality of service class change to a flexible charging unit, which determines charges for delivered bearer services. This allows to always accurately determine charges irrespective of changes in quality of service charges in real-time accuracy.

As shown in FIG. 4, optionally the quality of service class controlling unit 22 will store determined quality of service classes in the quality of service class memory unit 28. This is particularly beneficial when a request for a quality of service class change has been rejected, e.g., as lying outside a predetermined quality of service class setting range. Then, a reiterated resource consuming request of a same quality of service charge may be avoided for sake of networking resources. For the same reason, in the quality of service class memory unit also a notification of rejection of a request for quality of service class forwarded to the quality of service class management unit from the level of the bearer services may be stored therein.

Yet another option for the execution of the present invention would be to involve end equipment, e.g., a user terminal, during settlement of a quality of service class. Here, optionally a request for change of quality of service class may be forwarded to an end terminal using the bearer service and running an application for which the request for change of quality service is initiated. Then, the request for change of quality of service class forwarded from the quality of service class management unit 16 to the end terminal may be compared with the quality of service class setting range which may be pre-stored at the end terminal for approval of the requested change of quality of service class. Alternatively or in combination, the approval of the request for change of quality of service class may be achieved at the end terminal by prompting an end terminal user accordingly. Then, either after approval of the change of quality of service class the quality of service management unit will be notified accordingly, or otherwise a notification of rejection of the request of change of quality of service class will be returned from the end terminal to the quality of service class management unit.

In the following, an application of the inventive quality of service management concepts outlined so far with respect to FIGS. 1 to 4 will be explained with respect to an application scenario shown in FIG. 5.

Figure 5:
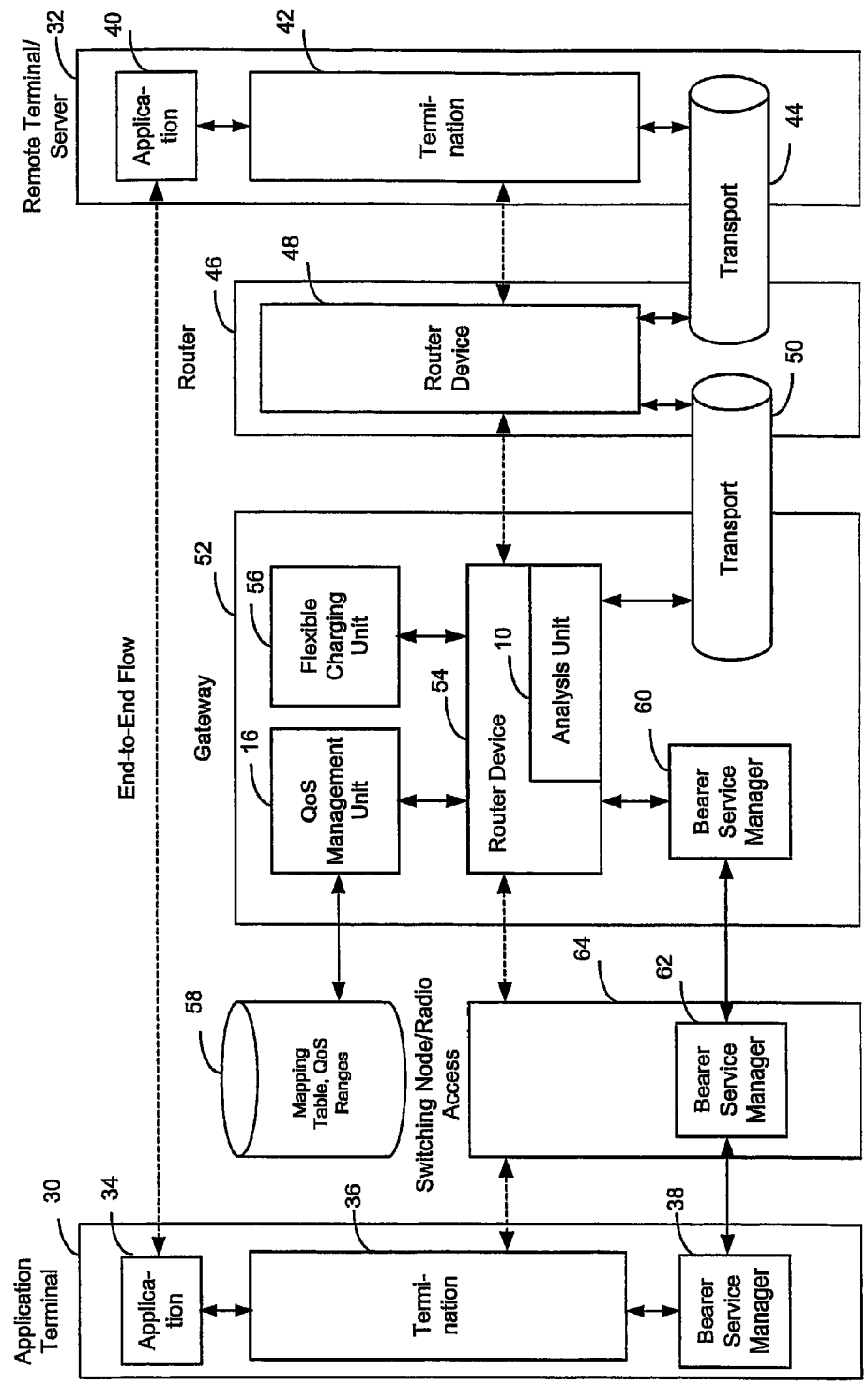
FIG. 5 shows one application scenario for the concept underlying the present invention.

As shown in FIG. 5, one application scenario relates to the interaction between an application terminal 30 and a remote terminal 32. The application terminal 30 contains a unit 34 running the application, a connection termination unit 36, and a bearer service managing unit 38. Similarly, the remote terminal/server 32 contains an application unit 40, a connection termination unit 42 and a bearer transport unit 44.

As shown in FIG. 5, the application terminal 30 and the remote terminal/server 32 are therefore embodied to allow for an end-to-end flow of application data. One typical scenario would be the interaction between a wireline communication network wherein the remote terminal/server 32 is operated in a wireless application terminal 30, e.g., in the form of a mobile telephone, a PDA, a laptop, etc.

As shown in FIG. 5, heretofore the remote terminal/server 32 is connected on a bearer transport level 44 to a router 46. A router 46 contains a routing device 48, which receives transport data from the remote terminal/server 32 and forwards it to a bearer transport channel 50. The bearer transport unit 50 is linking the router 46 with a gateway 52 provided for coupling the remote terminal/server domain network with the application terminal wireless network domain.

As shown in FIG. 5, for the related application scenario the bearer transport channel 50 is connected to a routing device 54 of the gateway 52. The routing device 54 is interacting with a flexible charging unit 56 determining charges for bearer service. Further, the routing device 54 is interworking with the quality of service management unit 16 incorporated into the gateway 52. The quality of service management unit 16 interrogates a mapping table and a quality of service setting range from a data base 58 operated in combination with the gateway 52. Further, the routing device 54 is interacting with a bearer service manager 60 operated in the gateway 52 for exchange of data between the gateway 52 and the application terminal 30 in the application terminal networking domain. The bearer service analysis unit 10 according to the present invention is, as one example, shown as incorporated in the routing device 54 of the present invention for analysis of bearer service characteristics. Here, it should be noted that the bearer service analysis unit 10 may also be operated separately from the routing device 54 or as stand-alone unit outside the gateway 52, as outlined above.

As shown in FIG. 5, the bearer service managing unit 16 is cooperating with a bearer service managing unit 62 of a switching node/radio access unit 64 operated in the application terminal networking domain. The bearer service managing unit 62 of the switching node/radio access node is cooperating with a bearer service managing unit 38 for exchange of data on the bearer service level.

From the above, it becomes clear that according to the present invention it is suggested to incorporate the bearer service analysis unit and any quality of service management unit into the quality of service framework, e.g., in the gateway 52. The end-to-end quality of service architecture according to the present invention is designed to meet a wide range of application quality of service requirements and to provide efficient network utilization, in particular via the radio interface.

Further, the application layer relies on quality of service functionalities in different parts of the end-to-end path. The services executed between the quality of service management unit 16 and the bearer service analysis unit 10 reflect the characteristics/parameters of higher layer application functionalities. The present invention uses control plane functions such as admission control and negotiation in order to distribute access to the shared set of resources in a fair and efficient manner between application end points. It ensures rejection of new service requests in periods of congestion in order not to excessively degrade the quality of service characteristics of existing bearer services in view of ongoing applications.

Figure 6:
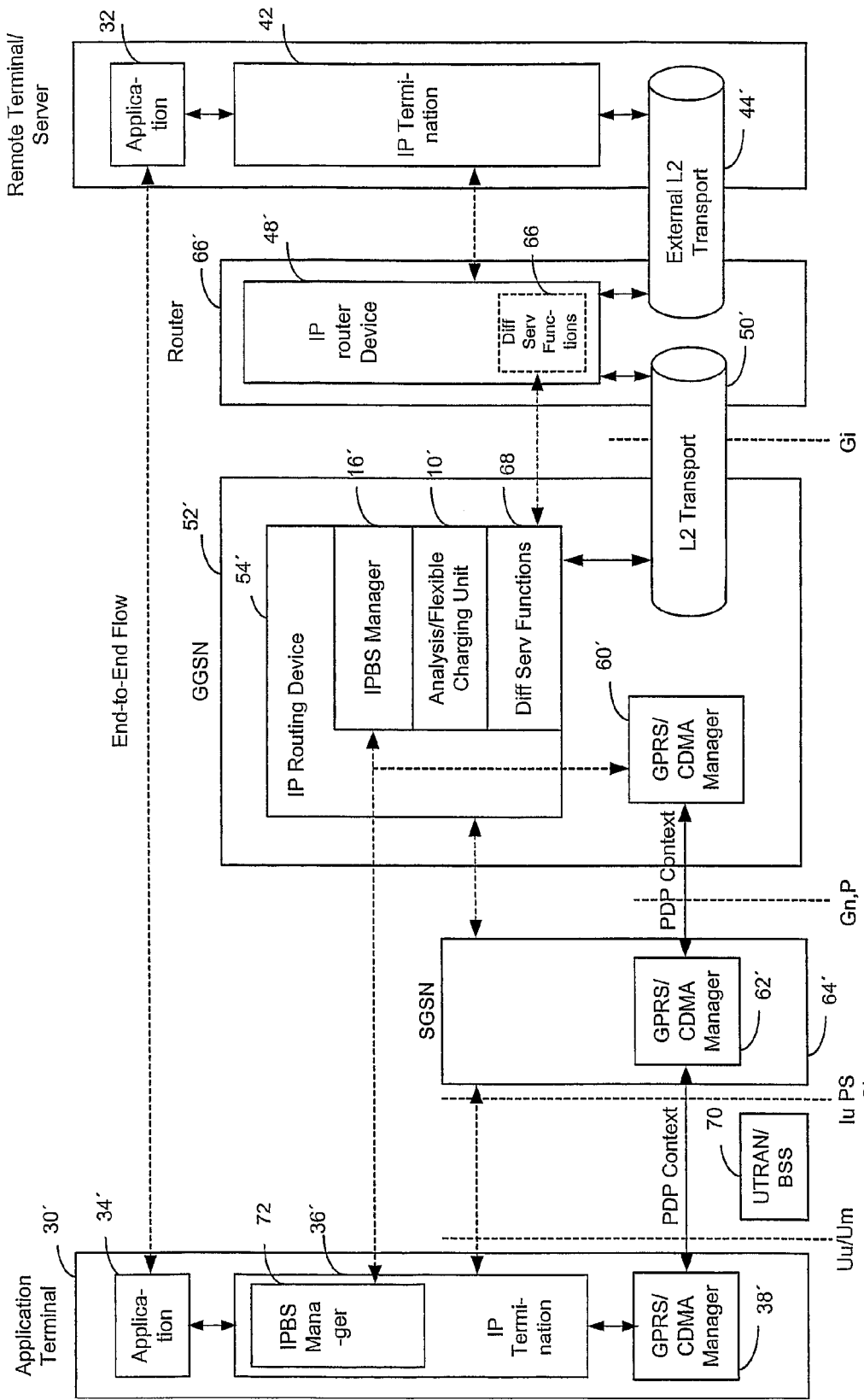
FIG. 6 shows another application scenario for the concepts underlying the present invention.

FIG. 6 shows a further application scenario for the different quality of service management concepts underlying the present invention outlined above. In particular, the application scenario illustrated with respect to FIG. 6 is related to the application of the Internet protocol IP in the remote terminal server networking domain and to the application of wireless communication on the basis of UMTS in the application terminal networking domain. Insofar as units shown in FIG. 6 have a functionality comparable to those of FIG. 5, they are indicated with similar primed reference numerals, and explanation thereof will not be repeated.

As shown in FIG. 6, according to the application scenarios shown in FIG. 6, the termination 42' in the remote terminal server 32' is an IP termination interacting with an L2 transport channel 44'. At the router 46', the routing device 48' is an IP routing device supporting DiffServ functions 66. The IP routing device cooperates with a L2 transport channel 50' for exchange of application data with a gateway 52' which in the application scenario shown in FIG. 6 is a gateway GPRS support node GGSN.

As shown in FIG. 6, the gateway GPRS support node GGSN 52' comprises the routing device 54' being adapted to the IP protocol. The IP routing device 54' has an IPBS manager 16' executing the functionality of the quality of service management unit 16 shown previously with respect to FIGS. 3 and 5, further the bearer analysis unit 10', which in addition to the bearer analysis functionality also has a flexible charging functionality. The IP routing device 54' also comprises a DiffServ function unit 68 in support of related IP functionality.

As shown in FIG. 6, the IP routing device 54' interacts with a GPRS/CDMA managing unit 60' at instantiation of the bearer service management unit 60 shown in FIG. 5. The GPRS/CDMA management unit 60' establishes a PDB context with a related GPRS/CDMA managing unit 62' of the switching node/radio access 64', which according to the application example shown in FIG. 6 is a serving GPRS support node SGSN. The GPRS/CDMA managing unit 62' of the supporting GPRS support node SGSN 54' establishes a PDB context with a GPRS/CDMA managing unit 38' of the application terminal 30' via a UTRAN/BSS networking unit 70. Here, data exchange between the supporting GPRS support node SGSN and the gateway GPRS support node 52' is executed via GnP, and further the data exchange between the supporting GPRS support node SGSN and the UTRAN/BSS networking node 70 is achieved via IuPS or Gp, and further the data exchange between the UTRAN/BSS networking node 70 and the GPRS/CDMA managing unit 38' of the application terminal 30' is achieved via Uu/Um. As shown in FIG. 6, the IP termination unit 36' of the application terminal 30' also comprises an IP managing unit for handling of quality of service management related issues at the application terminal 30' side.

Therefore, the application scenario shown in FIG. 6 relates to wireless IP networks and to QoS development towards fixed IP networks for set-up of a 3GPP QoS architecture. For the application scenario shown in FIG. 6, here again application entities require a determination of quality of service enabled bearer services between them. Therefore, for the application session it must be decided what media streams will be used, e.g., voice and video, and what performance requirements these media streams put on the quality of service enabled bearer services. These requirements are then consecutively fulfilled and mapped onto quality of service parameters of the available bearer services.

Also, as shown in FIG. 6, quality of service management according to the present invention is executed across different quality of service enabled networking domains interworking with each other via a gateway node 52'. The gateway GPRS supporting node GGSN shown as an example in FIG. 6 provides interworking functionality between the WCDMA/GPRS quality of service mechanisms and the IP QoS mechanisms in an automized manner without involvement of the end applications. As outlined previously, interworking at the gateway GPRS supporting node GGSN includes classification, mapping, marking/remarking and filtering for appropriate bearer service delivery. In addition, end-to-end application signaling may include information on successful establishment of local access bearer at each side.

For the application scenario shown in FIG. 6, the ideas underlying the present invention have been implemented by using information available at the gateway GPRS support node GGSN for selection of a quality of service class in automized manner.

As shown in FIG. 6, the application terminal 30' is not adapted to request a quality of service class from the IPBS managing unit 72. Further, a charging unit provided in the gateway GPRS supporting node 52' and a bearer service analysis unit 10' inform the IPBS managers 16' of the gateway GPRS supporting node GGSN 52' about an identified bearer service characteristic and related type of service. According to the present invention, it is then suggested that the IPBS manager of the gateway GPRS support node GGSN interacts with the GPRS/CDMA managing unit 60' to request from the WCDMA/GPRS BS managing unit 60' a quality of service change. Alternatively, the IPBS managing unit 16' interacts with the IPBS managing unit 72 of the application terminal 30' for confirmation of a quality of service of change request.

Here, according to the present invention it is suggested to use the flexible bearer charging which is available in the gateway GPRS support node 52'. The reason for this is that already the flexible bearer charging function examines the bearer service and performs a packet identification and service classification. Packet inspection means that the IP address, the UDP/TCP port and the high layer protocols which are used in the bearer connections are evaluated in the analysis/flexible charging unit 10' shown in FIG. 6. This information is then used to identify the bearer service which is performed via the respective bearer which information is used for charging the user dependent on the requested bearer service.

According to the present invention, it is suggested to use this information, which is already derived for the purpose of flexible bearer charging, to select a quality of service class in the IPBS manager 16'. A gateway GPRS support node GGSN 52' requests from the supporting GPRS support node SGSN 64' a change of quality of service class in dependency of the used bearer service.

A possible scenario would be that a user connects his application terminal 30', e.g., a notebook via GPRS to the Internet. By default, the lowest quality of service class or the highest quality of service class could be used at the beginning. Then, the user would start to download a file, and a packet inspection mechanism in the gateway GPRS support node would identify the protocol TCP and ftp as used protocols. In this case, the quality of service class would be maintained on a low level. After the download, the user would then start, e.g., a session initiated protocol SIP telephone session. Here, the packet inspection mechanism in the analysis/flexible charging unit 10' would identify UDP and SIP as used protocols and would request from the supporting GPRS support node SGSN 64' to assign a higher quality of service class. The charging would be adapted accordingly.

In more detail, for the application scenario shown in FIG. 6 it is suggested to reuse information of flexible bearer charging. The flexible bearer charging would filter certain parameters like protocol type, etc., of the IP connection and use a mapping table to determine a certain quality of service class. Then, the flexible bearer charging executed in the analysis/flexible charging unit 10' would trigger a request from the IPBS manager 16' to the GPRS/CDMA managing unit 60' to adapt the quality of service class accordingly. This could imply a comparison of quality of service classes and a related amendment if they differed.

As alternative, the analysis/flexible charging unit 10' could as well be enhanced in a way that besides protocol properties like IP addresses, port numbers, protocol types, also traffic characteristics like average message length, duration between two messages, etc., are taken into account for selecting a certain quality of service class. This implies that at the beginning the highest quality of service class would be chosen to allow for reliable measurement. A mapping table maintained at the quality of service class memory shown in FIG. 3 would allow to determine which quality of service class corresponds to which measured traffic characteristics.

Then, the analysis/flexible charging unit 10' would initiate request from the IPBS manager 16' to compare the determined quality of service class with the quality of service class operated at the bearer service level and to manage appropriate amendment thereof, should they differ.

Besides the usage of the flexible bearer charging and the usage of flexible characteristics, a further aspect relates to the operation of the IPBS managing unit 16' in the gateway GPRS support node 52'.

Here, the IPBS managing unit 16' in the gateway GPRS support node 52' could keep track of end-to-end quality service classes of ongoing application connections. As outlined above, the flexible bearer charging unit of the traffic characteristic evaluation could request from the IPBS managing unit information about the quality of service class of an ongoing IP connection and further eventually request a change of a quality of service class.

Here, three different alternatives are possible as follows:

i. The IPBS manager 16' requests from the CDMA/GPRS managing unit 16' to change a quality of service class of an ongoing connection. Heretofore, the gateway GPRS support node 52' also sends a quality of service class change request to the supporting GPRS support node 64'.

ii. The subscriber could define, e.g., in his HLR settings, the highest and lowest quality of service class he accepts. Then, the gateway GPRS support node GGSN 52' interrogates the home location register HLR to get the settings and compare them with the request for quality of service class change initiated by the IPBS manager 16'. If the requested change is within the subscriber setting, the IPBS managing unit 16' requests from the WCDMA/GPRS managing unit 60' to change the quality of service class. Otherwise, the IPBS managing unit 16' informs the analysis/flexible charging unit 10' that the quality of service class change is refused. Optionally, the rejection of the requested change of quality of service class is tracked for the application sessions, so that no further request for quality of service charge change would arise again.

iii. The IPBS managing unit 16' sends a request for quality of service class change to the IPBS managing unit of the application terminal 30' for approval thereof at the application terminal side 30'. Then, the user may evaluate his personal setting about acceptable quality of service classes or get a notification on his display for acceptance or rejection of the quality of service class change.

As outlined above, according to the present invention a user does not need to configure a quality of service class on the application level. Further, the applications running at a user end equipment do not need to be updated for setting of quality of service classes. According to the present invention, the communication system automatically selects a correct quality of service class, and an application does not need to have knowledge about a quality of service class definition which may be used in a communication network.

The invention claimed is:

1. A method of bearer service analysis in support of automatic quality of service class management, the method comprising the steps:

analysing a bearer service carrying packet switched service traffic in support of an application session for identification of at least one type of service used by the application session; and forwarding a result of bearer service analysis to a networking unit adapted to automatic quality of service class management according to the identified at least one type of service; wherein step of analysing of the bearer service comprises a filtering of characteristics of protocols used for exchange of packet switched service traffic and a reuse of information determined for flexible bearer service charging.

2. The method according to claim 1, wherein characteristics of protocols are related to addresses of data packets, port number of data packets, and protocol types.

3. The method according to claim 2, wherein the step of analyzing a bearer service comprises a filtering of characteristics of protocols used for exchange of packet switched service traffic.

4. The method according to claim 1, wherein the step of analysing the bearer service comprises an identifying of characteristics of the packet switched service traffic.

5. The method according to claim 4, wherein characteristics of the packet switched service traffic are related to average length of a service message and/or time elapsing between two service messages.

6. A method of automatic quality of service class management in support of an application session running on top of a bearer service carrying packet switched traffic, the method comprising the steps:

receiving an indication of at least one type of service used by the application session;

determining a quality of service class according to at least one type of service used by the application session;

evaluating whether a requested quality of service class change is allowable in view of the predetermined quality of service class setting range;

changing the quality of service class at the bearer service level when the requested quality of service class change is allowable;

requesting a quality of service class for the bearer service according to a determined quality of service class; and notifying a flexible bearer charging unit adapted to charge for bearer service delivery on the change of quality of service class.

7. The method according to claim 6, further comprising a step of interrogating a database (HLR) for identification of a pre-determined quality of service class setting range.

8. The method according to claim 7, further comprising a step of requesting a highest quality of service class at the beginning of service delivery.

9. The method according to claim 7, further comprising the steps:

comparing the determined quality of service class with a quality of service class selected on a bearer level; and requesting a quality of service class for the bearer service when the determined quality of service class differs from quality of service class selected on the bearer level.

10. The method according to claim 6, further comprising a step of referencing a mapping table establishing a relation between at least one type of service and a quality of service class.

11. The method according to claim 6, further comprising a step of forwarding a request for change of quality of service class to a bearer service managing unit when the determined quality of service class differs from quality of service class selected on the bearer level.

12. The method according to claim 6, further comprising a step of keeping track of a quality of service class requested according to type of service.

13. The method according to claim 11, further comprising a step of forwarding the request for change of quality of service class to at least one bearer service switching unit (SSGN) operated for bearer service delivery.

14. The method according to claim 6, further comprising a step of receiving notification on rejection of the request for change of quality of service class when the requested quality of service class change is not allowable.

15. The method according to claim 14, further comprising a step of keeping track of a notified rejection of the request for change of quality of service class for the time of establishment of the bearer service.

16. The method according to claim 6, further comprising a step of forwarding the request for change of quality of service class to an end terminal (MT) using the bearer service and running an application for which the request for change of quality of service class is initiated.

17. The method according to claim 16, further comprising a step of comparing the request for change of quality of service class forwarded from the quality of service class management unit with a quality of service charge setting range pre-stored at the end terminal for approval of the request for change of quality of service class.

18. The method according to claim 17, further comprising a step of approving the request for change of quality of service class at the end-terminal by prompting an end terminal user accordingly.

19. The method according to claim 17, further comprising a step of receiving notification on rejection of the request for change of quality of service class when the requested quality of service class change is not approved by the end terminal user.

20. A networking node adapted to bearer service analysis in support of automatic quality of service class management, the networking node comprising:
a bearer service analysis unit adapted to analyse a bearer service carrying packet switched service traffic in support of an application session for identification of at least one type of service used by the application session; and
an interface unit adapted to forward a result of bearer service analysis to a networking unit adapted to automatic quality of service class management according to the identified at least one type of service; wherein
the bearer service analysis unit is adapted to filter characteristics of protocols used for exchange of packet switched service traffic and to reuse information determined for flexible bearer charging.

21. The networking node according to claim 20, wherein the bearer service analysis unit is adapted to filter characteristics of protocols as addresses of data packets, port number of data packets, and/or protocol types.

22. The networking node according to claim 20, wherein the bearer service analysis unit is adapted to identify characteristics of the packet switched service traffic.

23. The networking node according to claim 22, wherein the bearer service analysis unit is adapted to identify an average length of a service message and/or a time elapsing between two service messages.

24. A networking node adapted to automatic quality of service class management in support of an application session running on top of a bearer service carrying packet switched traffic, the networking node comprising:
an interface unit adapted to receive an indication of at least one type of service used by the application session;
a quality of service class evaluation unit adapted to evaluate whether a requested quality of service class change is allowable in view of the predetermined quality of service class setting range.
a quality of service class assignment unit adapted to assign a quality of service class according to at least one type of service used by the application session; and
a quality of service class controlling unit adapted to request a quality of service class according to the determined quality of service class; wherein the quality of service class controlling unit is adapted to request change of the quality of service class when the requested quality of service class change is allowable; and
the interface unit is adapted to notify change of quality of service class to a flexible charging unit adapted to charge for bearer service delivery.

25. The networking node according to claim 24, wherein the quality of service class assignment unit is adapted to request a highest quality of service class at the beginning of service delivery.

26. The networking node according to claim 24, further comprising
the quality of service class comparison unit being adapted to compare the determined quality of service class with a quality of service class selected on a bearer level; wherein
the quality of service class controlling unit being adapted to request a quality of service class change for the bearer service when the determined quality of service class differs from the quality of service class selected on the bearer level.

27. The networking node according to claim 24, wherein the quality of service class assignment unit being adapted to reference a mapping table establishing a relation between at least a type of service and a quality of service.

28. The networking node according to claim 24, wherein the interface unit is adapted to forward a request for change of quality of service class to a bearer service managing unit when the determined quality of service class differs from the quality of service class selected on the bearer level.

29. The networking node according to claim 24, further comprising a memory unit adapted to keep track of a requested quality of service class.

30. The networking node according to claim 24, wherein the interface unit is adapted to forward the request for change of quality of service class to at least one bearer service switching unit (SSGN) operated for bearer service delivery.

31. The networking node according to claim 24, wherein the quality of service class controlling unit is adapted to interrogate a database (HLR) for comparison of the requested quality of service class with a pre-determined quality of service class setting range.

32. The networking according to claim 31, wherein the quality of service class controlling unit is adapted to maintain the quality of service class selected on the bearer service level when the requested quality of service class is not allowable.

33. The networking node according to claim 32, further comprising a memory unit adapted to keep track of rejection of a request for change of quality of service class for the time of establishment of the bearer service.

34. The networking node according to claim 24, wherein the interface unit is adapted to forward the request for change of quality of service class to an end terminal (MT) using the bearer service and running an application for which to the request for change of quality of service class is initiated.

35. The networking node according to claim 34, wherein the interface unit is adapted to receive notification of a rejection of the request for change of quality of service class when the requested quality of service class change is not approved at the end terminal.

* * * * *

UNITED STATES PATENT AND TRADEMARK OFFICE
CERTIFICATE OF CORRECTION

PATENT NO. : 7,764,623 B2
APPLICATION NO. : 11/814554
DATED : July 27, 2010
INVENTOR(S) : Stumpert et al.

It is certified that error appears in the above-identified patent and that said Letters Patent is hereby corrected as shown below:

In Fig. 2, Sheet 1 of 5, for Tag "S12", Line 1, delete "Ouality" and insert -- Quality --, therefor.

In Fig. 4, Sheet 3 of 5, for Tag "S14", Line 1, delete "Idication" and insert -- Indication --, therefor.

In Column 16, Line 17, in Claim 24, delete "range." and insert -- range; --, therefor.

In Column 16, Line 35, in Claim 26, delete "comprising" and insert -- comprising: --, therefor.

In Column 16, Line 66, in Claim 32, after "networking", insert -- node --.

Signed and Sealed this

Nineteenth Day of October, 2010

David J. Kappos
*Director of the United States Patent and Trademark Office*